United States Patent [19]

Birch

[11] Patent Number: 5,226,400
[45] Date of Patent: Jul. 13, 1993

[54] DEVICE FOR CONVERSION OF LIQUID FUEL INTO FUEL VAPOR AND MICROSCOPIC LIQUID DROPLETS

[75] Inventor: Desmond A. Birch, Golden, Colo.

[73] Assignee: MicroFuels, Inc., Wheat Ridge, Colo.

[21] Appl. No.: 958,006

[22] Filed: Oct. 8, 1992

[51] Int. Cl.$^5$ .................................. F02M 31/00
[52] U.S. Cl. ........................ 123/557; 123/549; 123/552; 123/590; 123/1 A
[58] Field of Search ............... 123/543, 545, 546, 547, 123/549, 552, 557, 590, 522, 1 A, 527, 579.7, 579.16, 533; 48/189.2

[56] References Cited

U.S. PATENT DOCUMENTS

| | | | |
|---|---|---|---|
| 1,806,581 | 5/1931 | Bethenod | 123/533 |
| 3,630,698 | 12/1971 | Baldwin | 123/527 |
| 4,040,403 | 8/1977 | Rose et al. | 123/522 |
| 4,175,525 | 11/1979 | Johnson | 123/522 |
| 4,483,305 | 11/1984 | Gilmor | 123/557 |
| 4,483,307 | 11/1984 | Gilmor | 123/557 |
| 4,488,517 | 12/1984 | Yoon | 123/1 A |
| 4,509,464 | 4/1985 | Hansen | 123/557 |
| 4,522,183 | 6/1985 | Meier et al. | 123/557 |
| 4,711,223 | 12/1987 | Carroll | 123/1 A |
| 5,137,005 | 8/1992 | Kirby | 123/592 |

Primary Examiner—E. Rollins Cross
Assistant Examiner—M. Macy
Attorney, Agent, or Firm—Fields, Lewis, Pittenger & Rost

[57] ABSTRACT

A fuel dispersion device has been provided in the form of a vacuum pump in which fuel is injected as macroscopic fuel droplets in metered quantities into a vacuum chamber in the pump where it is converted to a converted fuel in the form of a mixture of a smaller percentage of gaseous fuel and a larger percentage of microscopic liquid fuel droplets. This converted fuel is moved from the inlet to an outlet port by sweeping vanes. A combination of vacuum, expanding absorbed gases, mechanical energy and thermal energy is used to create gaseous fuel and microscopic liquid fuel droplets from macroscopic liquid fuel droplets. An air intake passageway is provided at one end of the mixing chamber at substantially right angles to the outlet from the vacuum chamber. An air-fuel discharge passageway is provided on the opposite side of the intake passageway for supplying the mixture of air and converted fuel to the engine for combustion. The mixing chamber is larger in area than the intake passageway so that the air slows down as it passes through the mixing chamber to allow for thorough mixing with the converted fuel. In addition, a diverter is provided in the center of the mixing chamber to further create turbulent flow of the air to assure thorough mixing. The mixing of relatively warm air with the microscopic droplets causes further evaporation and droplet size reduction. The entire system is operated by an electronic fuel management control module.

20 Claims, 4 Drawing Sheets

Fig_1

Fig_2

Fig_3

Fig_4

Fig_5

Fig_6

Fig_7

Fig_8

Fig_9

DEVICE FOR CONVERSION OF LIQUID FUEL INTO FUEL VAPOR AND MICROSCOPIC LIQUID DROPLETS

TECHNICAL FIELD

This invention relates to a device for converting liquid fuel into fuel vapor and microscopic liquid fuel particles prior to introduction into an intake manifold of an internal combustion engine. More particularly, the invention relates to the injection of macroscopic liquid fuel droplets into a rotary vane vacuum chamber wherein some of the macroscopic liquid fuel droplets are converted to a gaseous fuel and the rest are converted to microscopic liquid fuel droplets. After discharge from the vacuum chamber the gaseous fuel and microscopic liquid fuel droplets are mixed with air and supplied to the intake manifold of the internal combustion engine.

BACKGROUND ART

It is well understood that the greater the vaporization or gasification of liquid fuel that can be accomplished the greater the surface area of the fuel which is subject to oxidation and therefore the higher the rate of combustion. Many individuals working in the field felt that if complete conversion of the fuel to the gaseous state could be accomplished, a highly efficient clean operating engine could be provided. Attempts to completely gasify liquid hydrocarbon fuel go back many years. However, all of these attempts have had significant shortcomings. In some instances, the devices did not completely vaporize the fuel and therefore the expected increase in efficiency did not materialize. In other cases, the devices were of such a complex nature as to negate any real benefit from them or require such high power inputs themselves that even though a greater fuel efficiency was realized, the increased power needs negated this benefit. The complete conversion of fuel to vapor created another unexpected problem. Although the fuel would rapidly and completely burn, it was discovered that the expansion of the fuel in forming a gas occurred too early. Therefore, the density of the fuel, when mixed with air was so low that not enough fuel could be directed into the combustion chambers of the engine to generate power equal to other state of the art devices such as carburetors, throttle body injection systems or direct port injection systems.

One of the most noted prior art devices which was developed by Charles Nelson Pogue in the 1930s was a carburetor for the vaporization of gasoline which has been widely advertised as the "two hundred mile per gallon carburetor". This device has never enjoyed wide commercial success because it is nearly as large and cumbersome as the engine it is meant to fuel and it requires an operating temperature which approaches the flash point of the fuel, such as gasoline, so that the potential for an explosion is quite great.

A device for vaporizing fuel, such as diesel fuel is disclosed in U.S. Pat. No. 1,806,581 to Bethenod for "Fuel Supply System For Internal Combustion Engines of Variable Load For Using Heavy Fuels". The diesel fuel is supplied through a conventional gasoline carburetor and air is drawn through an intake by means of a vacuum pump. This system is an open system, i.e., air in large quantities is continuously drawn in from the atmosphere by a first vacuum pump. A second vacuum pump is intended to pull a vacuum on the air-fuel mixture in a reservoir to vaporize the fuel whereupon it is fed into a manifold of an engine which is supplied with still an additional air intake. Heat exchange means are provided around the reservoir and again near the intake manifold to minimize fluctuations in fuel temperature. Because the system is open, large quantities of air are drawn through it making it very difficult to draw a sufficient vacuum to substantially vaporize any fuel which is not vaporized directly by the carburetor. In other words, for such a device to operate effectively it would be necessary to provide such a huge vacuum pump that the fuel savings, if any, would be negligible. Alternatively, with a smaller vacuum pump the fuel is not properly vaporized in an open system because atmospheric air is constantly being drawn into the system.

Another device for providing gaseous fuel to the carburetor of an internal combustion engine is shown in U.S. Pat. No. 3,630,698 to Joseph H. Baldwin for "Fuel System". In this device, gaseous vapors are drawn from a vacuum chamber by means of a manifold vacuum. The vacuum chamber contains a supply of liquid fuel which is replenished through a float valve. Two potential problems are associated with this type of device. First, the vacuum from the manifold may not be sufficient under certain load conditions to provide sufficient fuel to the engine. Second, by drawing the gaseous vapors off of a body of liquid gasoline the lighter hydrocarbons are boiled off first, leaving a relatively heavy liquid hydrocarbon, frequently referred to as "strip oil". Therefore, in order to keep them working properly, means must be provided to regularly withdraw the strip oil and replace it with fresh gasoline.

Another device for vaporizing gasoline is disclosed in U.S. Pat. No. 4,040,403 to Rose, et al. for "Air Fuel Mixture Control System". In this device, fuel is supplied to a vaporizer wherein the level of the liquid fuel in the vaporizer is controlled by a float valve. Hot exhaust gases from the engine are boiled through the liquid gasoline causing a portion of it to be vaporized and carried to the engine. The device includes a complex amplifying system for adjusting the air-fuel mixture and a separator for taking out any fuel droplets from the fuel as it is vaporized in the vaporizer. With this device, the lighter hydrocarbons will be vaporized leaving behind the heavier hydrocarbons or strip oil.

U.S. Pat. No. 4,175,525 to Johnson for "Fuel Vaporizer System For Internal Combustion Engines" discloses a sealed vaporization system connected between a fuel supply line and the intake manifold of an internal combustion engine and operated in parallel with a carburetor. A float valve is provided in this device to control the flow of liquid fuel to a chamber wherein it is vaporized and fed to a carburetor. The lighter hydrocarbons will be boiled off the liquid fuel before the heavier hydrocarbons, leaving strip oil in the chamber.

Additional devices for vaporizing fuel are disclosed in U.S. Pat. No. 4,483,305 for "Fuel Vaporization Device" to James E. Gilmor and U.S. Pat. No. 4,483,307 for "Fuel Vaporization Device For Internal Combustion Engine", also to James E. Gilmor. These devices are designed to instantaneously vaporize all of the fuel.

U.S. Pat. No. 4,522,183 to Meier et al. for "Method For Converting a Retrograde Substance to the Gaseous State" is directed to a method wherein the fuel is pre-pressurized and heated and the pressure released for abruptly converting a retrograde fuel to a gaseous state. While the method may be effective to accomplish its intended result, it is not believed that sufficient fuel can be provided to an internal combustion engine by the practice of this method to operate it satisfactorily, particularly under load.

The ultimate carburetion system would be one in which a small percentage of the fuel is vaporized and the rest of the fuel is converted to microscopic liquid fuel droplets prior to introducing the fuel into the intake manifold of an internal combustion engine. When mixed with air in the manifold the vaporized fuel and the microscopic fuel droplets disperse with some additional vaporization.

For convenience, gaseous fuel will be referred to as "vapor" or "vaporized fuel"; liquid fuel droplets of a size not visible with the naked eye, under normal lighting conditions, will be referred to as "microscopic" particles or droplets and liquid fuel droplets of a size which is visible with the naked eye will be referred to as "macroscopic" droplets. Ideally, macroscopic liquid fuel droplets from a suitable source, such as one or more fuel injectors, are converted to a mixture consisting of a small percentage of fuel vapor and a large percentage of microscopic fuel droplets. This mixture will be referred to as "converted fuel".

DISCLOSURE OF THE INVENTION

In accordance with the present invention, a device for converting a combustible liquid fuel into converted fuel having a smaller proportion of vapor and a larger proportion of microscopic fuel droplets, mixing the converted fuel with air in a manifold to convert more of the converted fuel to a vapor and transferring the converted fuel and air mixture into a combustion chamber is provided. The device includes a vacuum chamber formed as a cylindrical housing wall having a longitudinal axis with at least one fuel inlet in the housing wall and a fuel outlet in the housing wall offset from the inlet. An eccentrically mounted cylindrical rotor is provided within the housing wall for rotation about a longitudinal axis about bearings mounted in opposite end walls. The rotor has a plurality of radial slots and a generally rectangular vane slidably received in each of the slots. The vanes are urged outwardly against the housing wall when the rotor is rotated.

For lubrication the inner surface of the housing may be coated with a lubricous material. This may be a polytetrafluoroethylene (PTFE) matrix such as Teflon ®. Alternatively a sleeve may be used inside of the housing which is made of a polyamid, such as Torlon ®. The vanes are made of a polyamide having a durometer or hardness which is less than that of the lining. If desired, spring means can be provided for urging the vanes outwardly against the housing wall. The vanes are arranged in opposing relationship and the spring means can include a pin positioned between opposite springs to urge the vanes against the housing wall.

More particularly, the rotor has a surface which comes into near contact, e.g., within two-thousandth of an inch, with the cylindrical wall along a near contact line lying in a common plane with the axis of the rotor to form a vacuum chamber between the rotor and the cylindrical wall. A liquid fuel inlet in the form of a fuel injector can be mounted through each end wall in opposing relationship with each other. The injectors are angularly spaced within the vacuum chamber to the upstream side of the plane and as close to the near contact line as the introduction of fuel through the injectors will permit. Alternatively, the injectors can be mounted in the cylindrical wall of the housing in the same angular relationship. The converted fuel outlet extends through the cylindrical wall of the vacuum chamber into communication with an air-fuel mixing chamber just upstream of the near contact line.

The fuel injectors inject macroscopic droplets of liquid fuel through the inlets into the vacuum chamber where it is converted to microscopic fuel and vaporized fuel. This is accomplished by a combination of vacuum, expanding absorbed gases and water vapor in the macroscopic fuel droplets, and mechanical and heat energy from the action of the vacuum pump.

An air plenum has an air-fuel mixing chamber connected to the vacuum pump outlet port for receiving and mixing the converted fuel with air introduced through an air inlet port in the air plenum. An air intake passageway connects at one end of the mixing chamber to the air inlet port and is at substantially right angles to the converted fuel outlet from the vacuum chamber. An air-fuel discharge passageway is provided on the opposite side of the intake passageway for supplying the mixture of air and converted fuel to the manifold and then to the engine for combustion. The mixing chamber is larger in area than the intake passageway so that the air slows down as it passes through the mixing chamber creating a tumbling effect to allow for thorough mixing with the converted fuel. In addition, a diverter is provided in the center of the mixing chamber to further create turbulent flow of the air to assure thorough mixing.

From the foregoing, the advantages of this invention are readily apparent. A very simple, and therefore economical, device has been provided for converting microscopic liquid fuel particles into converted fuel having the proper ratio of vaporized fuel and microscopic fuel particles. By use of vacuum, expanding absorbed gases, mechanical energy and thermal energy the converted fuel is formed. The converted fuel is mixed with air in a novel mixing chamber which causes thorough mixing with some additional evaporation and droplet breakup. Thus, the combustion of the fuel in the engine will be enhanced, thereby minimizing the amount of unburned hydrocarbons and maximizing fuel economy. By utilizing a lubricous material, the problems of lubricating the parts in a fuel-rich vacuum environment, wherein the lubricant would be dissolved and may vaporize, is minimized.

Additional advantages will become apparent from the description which follows, taken in conjunction with the accompanying drawings.

BEST MODE FOR CARRYING OUT THE INVENTION

Figure 1:
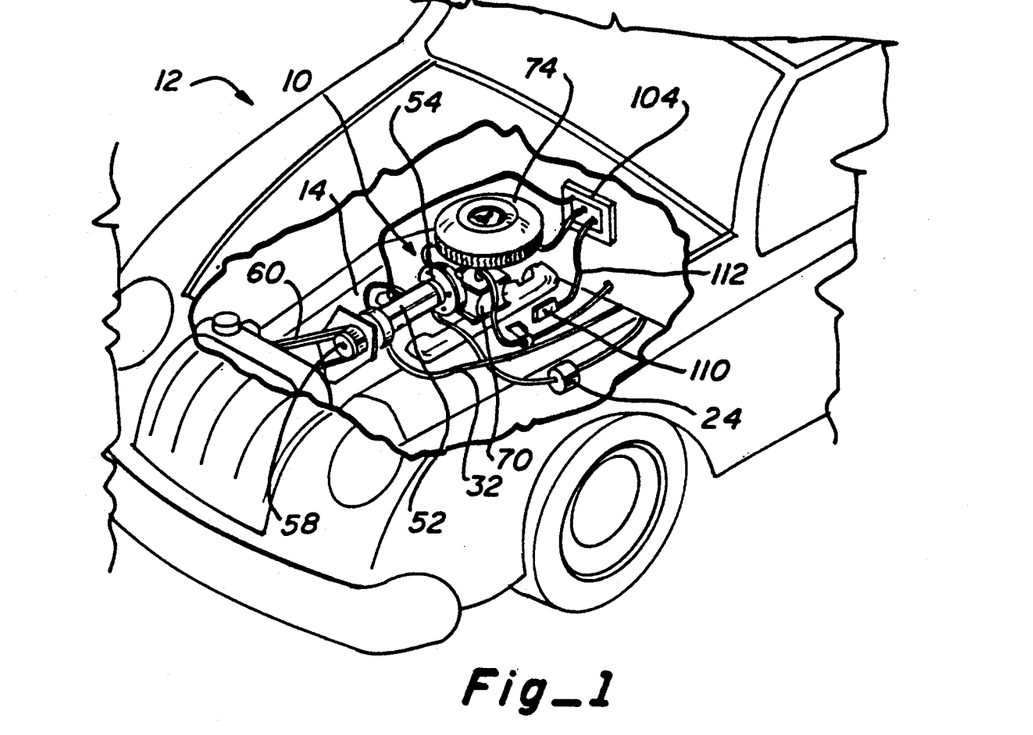
FIG. 1 is a fragmentary perspective view of a vehicle having the fuel conversion device of this invention installed therein.
Figures 3, 4, 5:
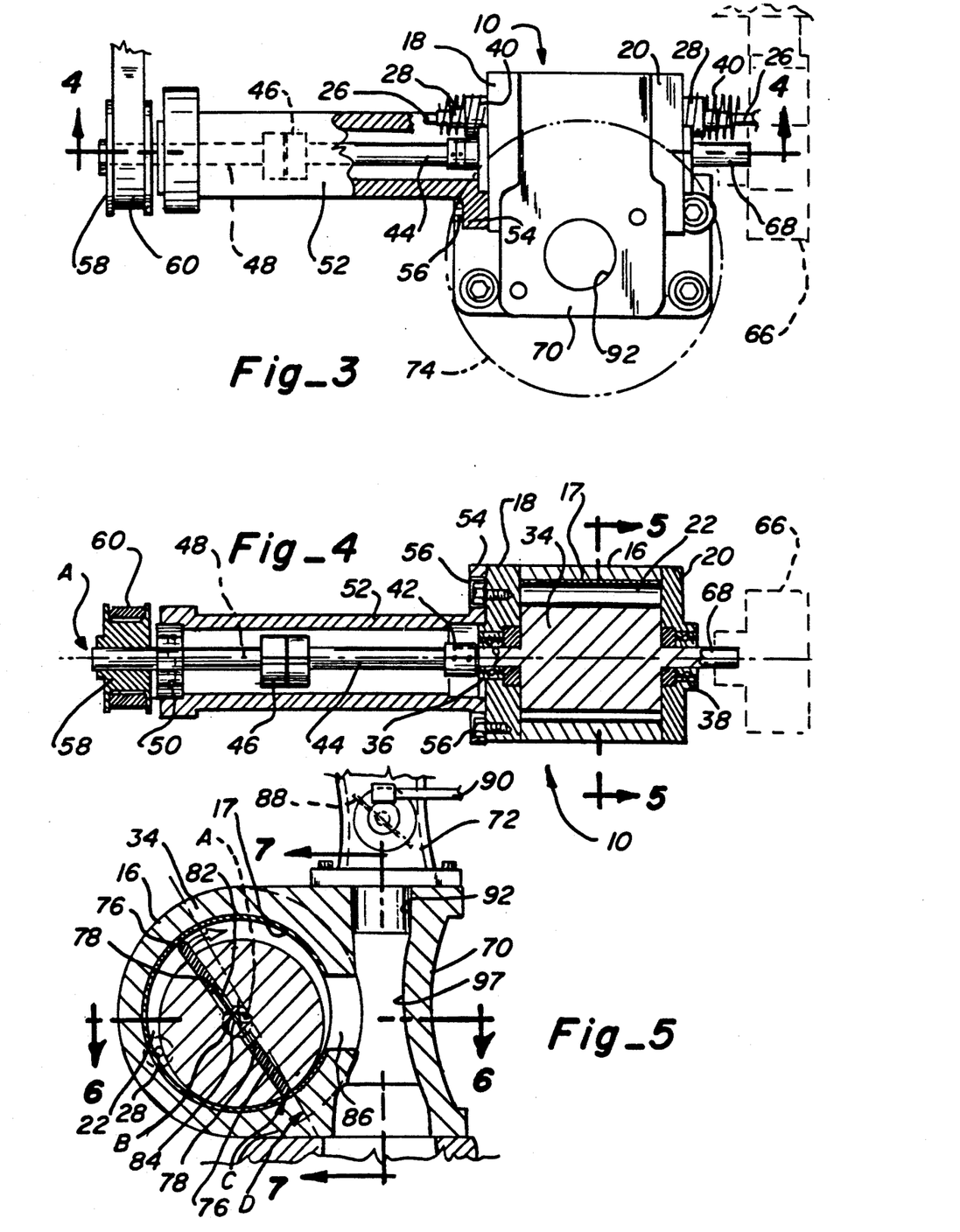
FIG. 3 is an enlarged horizontal section, taken along line 3—3 of FIG. 2, showing the fuel converter of this invention and associated drive mechanism therefor.
FIG. 4 is a horizontal section, taken along line 4—4 of FIG. 3, showing details of a one-way clutch and bearing mounts for the fuel converter.
FIG. 5 is an enlarged horizontal section, taken along line 5—5 of FIG. 4, showing details of the air-fuel mixing chamber and rotor.

As illustrated in FIG. 1, the fuel converter 10 of this invention is installed in a vehicle 12 adjacent the engine 14. The fuel converter includes a generally cylindrical housing 16 having a longitudinal axis A and opposed front end plate 18 and rear end plate 20, as shown in FIG. 4, to form a vacuum chamber 22. Suitable lubrication within the vacuum chamber is a problem. Liquid lubricants, i.e., oils and greases, will not work because they will be dissolved and removed by the fuel and will tend to evaporate, particularly when gasoline is used as a fuel because of the higher temperatures. To overcome this, the housing has a lining 17 made from a lubricous material, such as a polyamide. One such polyamide which is suitable is Torlon®. Alternatively, a PTFE coating, such as a Teflon® matrix can be used. Fuel is supplied by means of a fuel pump 24 through a fuel line 26 to fuel atomizing devices, such as fuel injectors 28. A fuel pressure regulator 30 is located in return fuel line 32 for returning fuel which is not used by the fuel injectors to the fuel tank (not shown).

Rotor 34, shown in FIG. 4, is journaled in a front bearing 36 mounted in front end plate 18 and a rear bearing 38 mounted in rear end plate 20. The rotor is mounted for rotation about a longitudinal axis A spaced laterally from housing axis B, as best seen in FIGS. 4 and 5. The rotor makes near contact with the housing wall 16 along line C. In one form of the invention, the spacing along line C is approximately one-thousandth of an inch. Conveniently, the heat generated by these bearings during operation of the fuel converter 10 will heat the end plates and the respective injectors 28 to preheat the fuel before it passes into vacuum chamber 22. Also, heating coils 40 can be provided around each fuel injector 28 to pre-heat the fuel for cold starts when the ambient temperature is extremely low. Alternatively, heating coils (not shown) could be provided in the walls or ends of vacuum chamber 22 to reheat the fuel. The injectors 28 lie on the upstream side of a plane D formed by axis A and line C and as near to line C as is possible and still inject the fuel. The reason for this is so the fuel remains in the vacuum chamber as long as possible to more greatly facilitate the formation of converted fuel.

Figure 2:
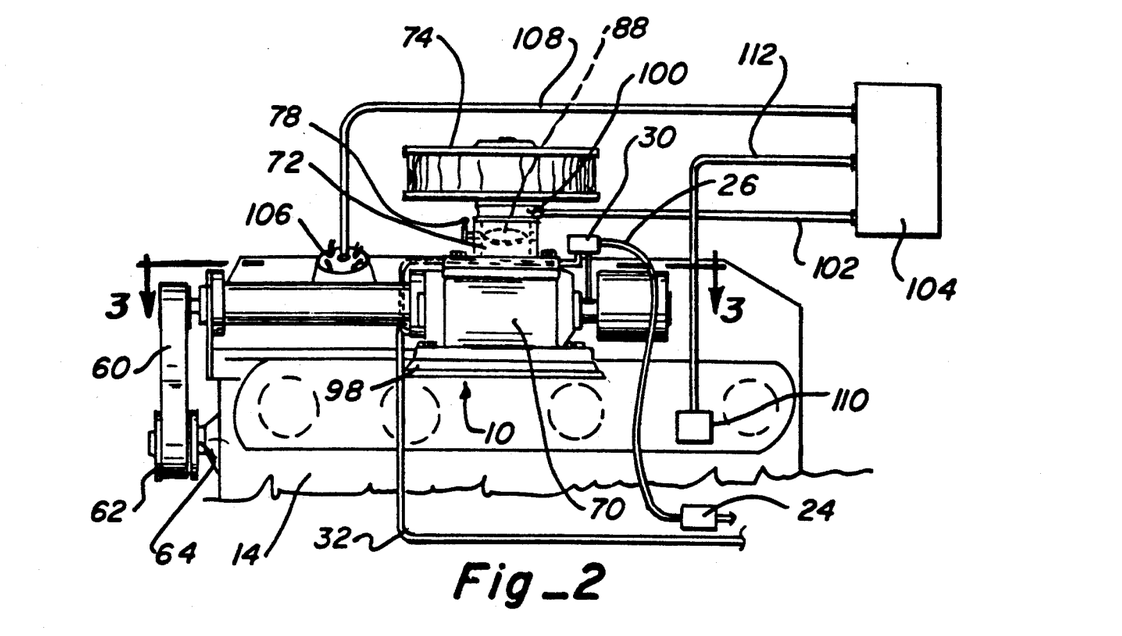
FIG. 2 is an enlarged side elevation of the fuel conversion device of this invention connected to the intake manifold of an internal combustion engine.

The rotor 34 is connected by coupling 42 to a driven shaft 44. The forward end of driven shaft 44 is connected through a one-way slip clutch 46 to a drive shaft 48. This drive shaft is supported in bearing 50 at the forward end of cylindrical housing 52. The other end of housing 52 is provided with a flange 54 attached to front end plate, as by bolts 56 spaced around the periphery thereof. Drive shaft 48 is driven by pulley 58 which in turn is driven by belt 60 driven from pulley 62 attached to pully shaft 64 of engine 14, as best seen in FIG. 2.

During cold weather, the generator or alternator of the vehicle may not turn the engine and the fuel converter 10 at sufficient speed to create sufficient vacuum to convert the fuel from macroscopic liquid droplets to vapor and microscopic liquid particles at a sufficient rate to start the engine. Therefore, if required, an electric motor 66 can be mounted behind the fuel converter 10 which will be operated directly off the battery (not shown) to drive the rotor through a stub shaft 68 connected thereto at a much higher speed so that enough fuel will be converted and supplied to the engine to start it. This is possible because one-way clutch 46 allows driven shaft 44 and rotor 34 to turn faster than drive shaft 48. By way of example, electric motor 66 may rotate rotor 34 at 750 rpm or more while the engine is turning at 150 rpm during starting. After starting, electric motor 66 will be turned off and the engine and rotor will rotate at the same speed.

After conversion, the fuel passes from vacuum chamber 22 into a plenum 70 where it is mixed with air supplied through conduit 72 so that the air flow is at right angles to the converted fuel to assure maximum mixing as more fully described below. Conveniently, the air is drawn through a filter 74, connected to the other end of conduit 72.

Turning now to FIGS. 5-9, the rotor 34 has a plurality of vanes, such as two opposed vanes 76 which are urged apart as by a pair of leaf springs 78 received in recesses 80 of the vanes. A pin 82 has opposite ends bearing against leaf springs 78 and reciprocated within passageway 84 extending through rotor 34 between vanes 76. The vanes are coated with the same lubricous material as the housing liner, but having a lesser hardness or durometer than the housing liner. This assures that most of the wear that occurs will be along the edge of the vanes, which can be easily replaced. As can be seen, with rotor 34 mounted for rotation eccentrically with respect to housing 16, the vanes will be urged against the inner surface of the housing but will move reciprocally back and forth as the rotor rotates. Since the spacing of the two vanes remains substantially constant, there will be little flexure of springs 78 and therefore the chance of failure of the springs through extended use is very minimal. In fact, when the pump is in operation centrifugal force will hold the vanes outwardly. However, for starting purposes it is desirable to have the springs in place to keep the vanes extended. With the use of starter motor 66, for most applications springs 78 and pin 82 will not be needed since the centrifugal force on the vanes created when motor 66 is energized will be sufficient.

The fuel injected into vacuum chamber 22 as macroscopic liquid fuel droplets is converted to vapor and microscopic fuel particles which are moved around the chamber by the vanes and discharged through a pair of outlet ports 86, located downstream of plane D.

As best understood at the present time, a number of forces act upon the macroscopic liquid fuel droplets introduced by the fuel injectors. These are:

1. Vacuum, which is a direct result of the vacuum environment of the device, causes rapid vaporization of fuel from the surface of the droplets thereby causing some reduction in the sizes of all droplets.

2. Absorbed gas expansion, which also is a direct result of the vacuum environment of the device, caused absorbed gases such as nitrogen, oxygen, water vapor and other atmospheric gases to expand within the macroscopic droplets blowing them apart into smaller microscopic droplets thereby exposing more surface area for further boiling off of liquid fuel from the microscopic droplets. Evaporization alone is not sufficient to cause both significant vaporization and droplet size reduction, particularly with less volatile fuels such as alcohols and alcohol mixtures. The vaporization is a self-limiting process because the evaporation process absorbs heat from the droplets which rapidly reduces their temperatures such that the evaporation rate rapidly decreases to an insignificant level. The absorbed atmospheric gases and most volatile species of the fuel rapidly expand causing eruptive boiling of the droplets breaking them into much smaller droplets.

3. Mechanical energy from vanes, rotor and housing agitate the macroscopic liquid droplets to distort and spread them out and break the surface tension within the droplets to further release absorbed gases.

4. Heat energy from contact with vanes, rotor and housing raises the temperature of liquid droplets to enhance vaporization and expansion and release of absorbed gases.

The foregoing explanation is believed to be accurate, to the extent that the forces acting upon the fuel droplets are understood at the present time. However, it should be understood that there may be additional forces acting on the droplets and/or the magnitude of the effect of the forces described above may be greater or lesser than presently understood.

Figures 6, 7, 8:
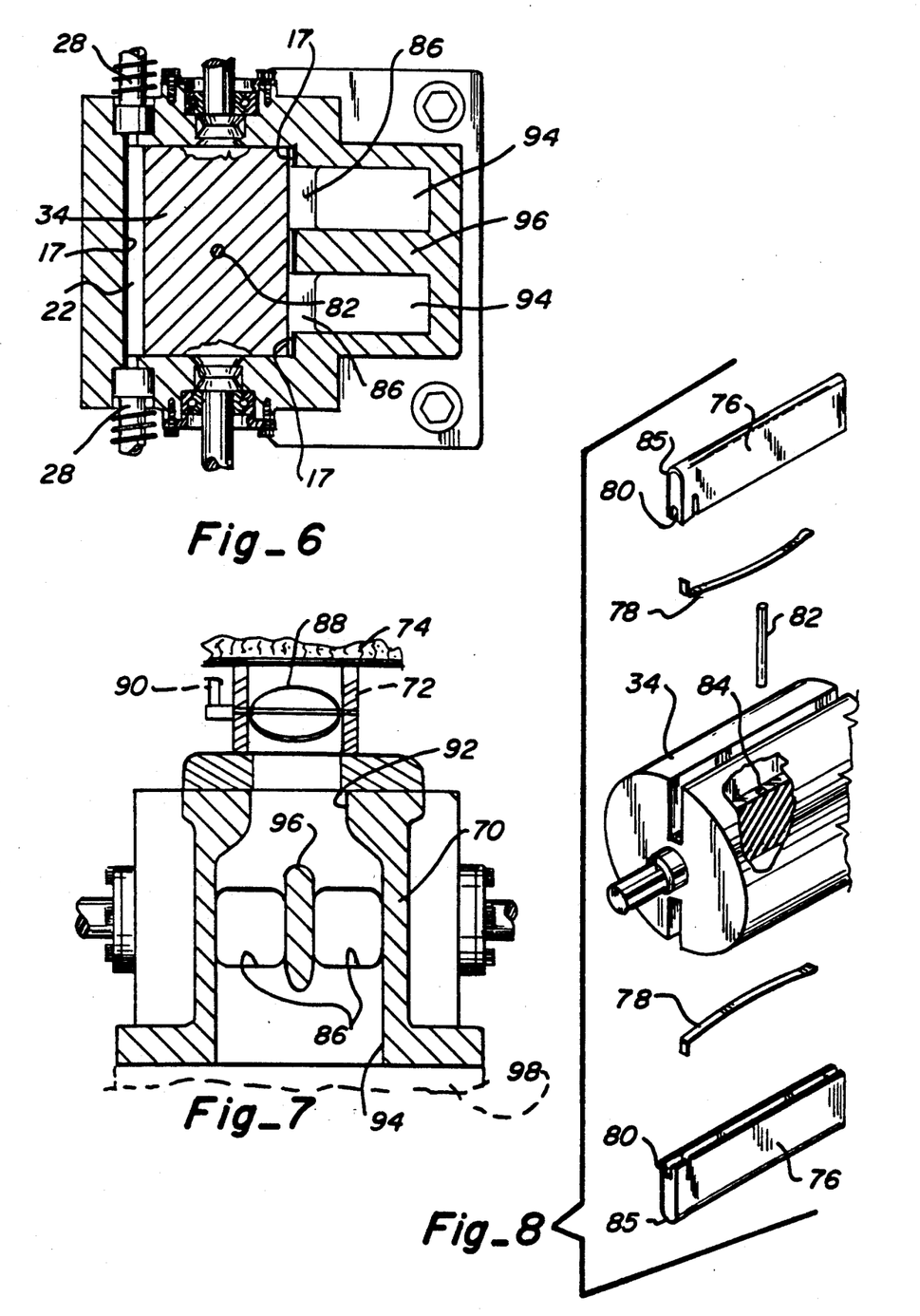
FIG. 6 is a horizontal section, taken along line 6—6 of FIG. 5, showing additional details of the mixing chamber and rotor.
FIG. 7 is a vertical section, taken along line 7—7 of FIG. 5, showing further details of the mixing chamber.
FIG. 8 is an exploded view of the rotor showing the vanes and associated parts.

Turning to FIG. 7, air flows through conduit 72 past a butterfly valve 88 controlled through a butterfly linkage 90 connected to the accelerator (not shown). This intake air passes through a throat 92 in plenum 70 and into a larger mixing chamber 94 which includes outlet ports 86 from vacuum chamber 22 and also a center dividing wall 96 between outlet ports 86 and curved wall 97 opposite ports 86. Thus, as the air moves from throat 92 into larger chamber 94, its flow will slow down. The dividing wall 96 and curved wall 97 cause turbulence in the air so that it mixes thoroughly with the gaseous fuel and microscopic fuel particles being discharged into chamber 94 from discharge openings 86 which are at right angles to the flow of air through chamber 94. The relatively warm air which is mixed with the fuel will heat the microscopic fuel droplets causing additional evaporation and droplet size reduction. By injecting the converted fuel into the air at right angles, good mixing of the air and fuel is assured which will improve the burning of the fuel in the cylinders of the engine. Thus, a very efficient and clean burn is assured.

Figure 9:
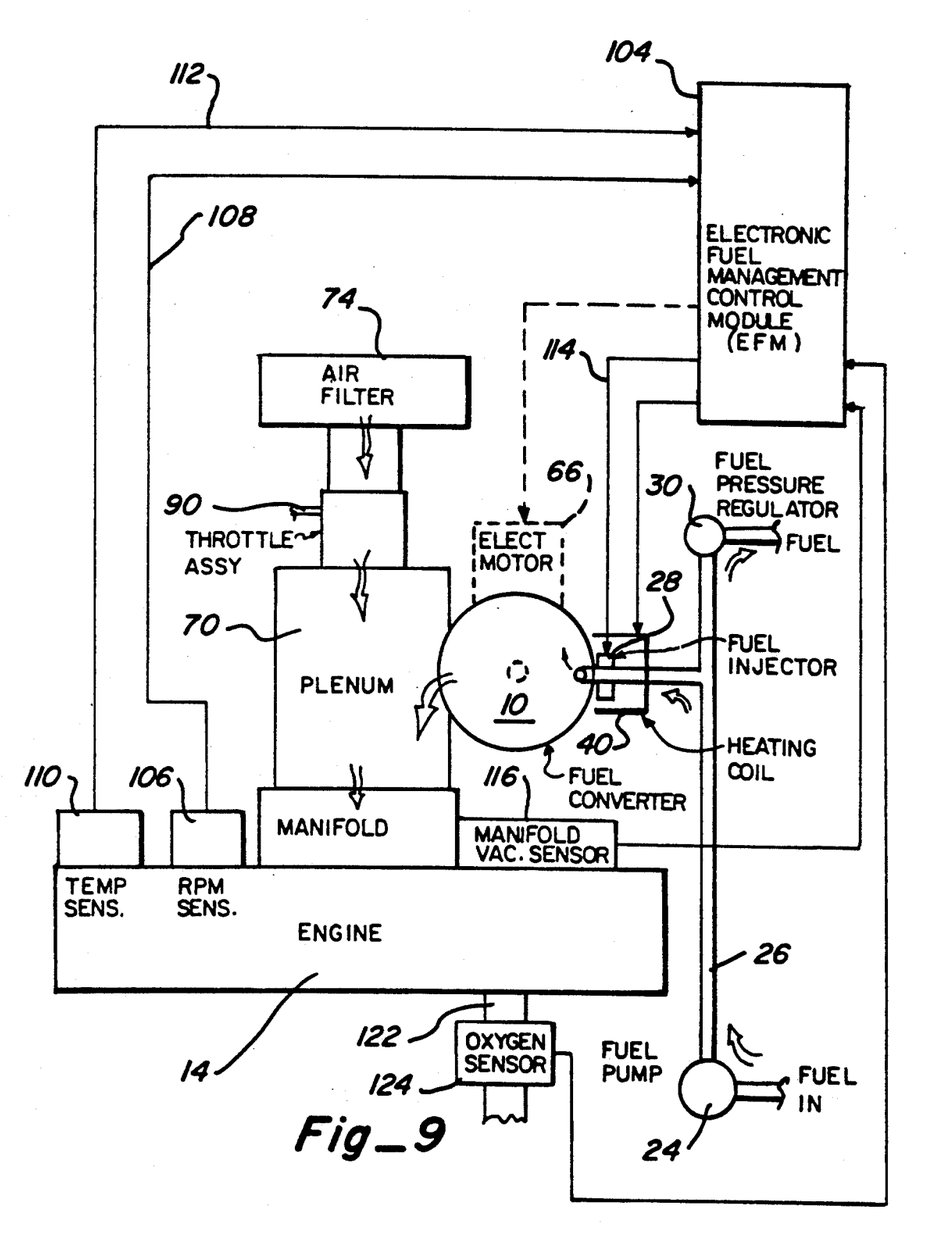
FIG. 9 is a diagrammatical view of the fuel converter of this invention connected to an internal combustion engine, showing typical electronic sensing devices to control the fuel converter.

As best seen in FIG. 9, an electronic fuel management (EFM) control module 104 is provided. This control module receives various signals from RPM sensor 106 mounted on engine 14 through a wire 108. A temperature sensor 110 on engine 14 provides a signal through wire 112 to the control module. The control module processes these signals and provides a signal through wire 114 to fuel injectors 28, which provides fuel to the converter in accordance with the parameters sensed by the control module. Thus, if butterfly valve 88 is opened to provide more air to the engine, the manifold pressure sensor 116 will provide a signal to control module 104 which will cause the control module to send a signal through wire 114 to the fuel injectors to open them further to provide more fuel to pump 10. When the butterfly valve 88 is closed due to releasing the accelerator, the reverse will occur. The temperature sensor 110 is provided for cold starts. It is useful for engines fueled by alcohol and provides further input to the control module for regulating the fuel injection when the engine is initially started. A suitable system has been found, an engine management system manufactured by Digital Fuel Injection Incorporated at 37732 Hills Tech Drive, Farmington Hills, Mich. 48331, which has external program capabilities to adjust fuel ratio across the entire range, for various fuels. Also, most original equipment automobile manufacturers' management systems can be modified to manage the fuel converter of this invention.

Additionally, a manifold vacuum sensor 116 is connected to control module through wire 118 and an oxygen sensor 120 on engine tailpipe 122 is connected by wire 124 to control module 104. Many other sensors (not shown) may be provided to measure other engine conditions or functions for electronic fuel management.

As of the date of this application, applicant's fuel conversion device has only been operated at an elevation of approximately five-thousand feet above sea level. Thus, the parameters set forth below are for this elevation and would vary at either higher or lower elevations in accordance with well-known physical laws. In a fuel conversion device wherein the vacuum chamber 22 is formed within housing 16 which has an interior diameter of 2.60 inches and a length of 3.00 inches and the diameter of rotor 34 is 2.50 inches. When the rotor is rotating at an idle speed of between 700 and 750 rpm, the device draws approximately 24.5 inches of mercury at an ambient temperature of 80° F. before introduction of fuel. At operating speeds between 1700 and 2000 rpm, after fuel is introduced in sufficient quantity to operate the engine at these speeds, the device stabilized at 23.5 to 23.7 inches of mercury. At these speeds and at ambient temperatures of between 45° F. and 80° F., the device will produce at the outlet converted fuel, a smaller portion of which is vapor, and a larger portion of which is microscopic liquid droplets. As the microscopic fuel droplets move through the vacuum chamber, the mixing chamber and the manifold, additional microscopic fuel droplets are vaporized as previously described.

By way of example, vacuum chamber 22, of the size described above, is connected to mixing chamber 94, wherein throat 92 has a diameter of 1.50 inches and an outlet into the manifold of 1.90 inches. The outlet ports 86 which communicate the vacuum chamber with the mixing chamber each are 1.0625 inches wide by 1.375 inches high. The dividing wall 96 is 1.9375 inches long and 0.50 inches wide.

The invention has been described as utilizing a single vacuum pump with an engine. However, it is contemplated that a very small vacuum pump could be used to supply fuel to each cylinder to the engine for some applications.

From the foregoing, the advantages of this invention are readily apparent. A fuel converter has been provided in the form of a vacuum pump into which liquid fuel is injected in the form of macroscopic liquid particles in metered quantities into a vacuum chamber. The internal components of the vacuum chamber are made of or coated with a lubricous material. A portion of the fuel is vaporized into gaseous fuel and the rest is converted into microscopic liquid particles. This fuel is moved from the inlet to the outlet ports by sweeping vanes. After passing through the outlets, the fuel is mixed with air in a plenum wherein the fuel enters a plenum at substantially right angles to the direction of the fuel to assure thorough mixing. The plenum opens from a narrower throat into a larger mixing chamber which contains a dividing wall. This causes the air and fuel to mix thoroughly before it is introduced into the manifold and engine. By use of vacuum, expanding absorbed gases, mechanical energy and thermal energy the converted fuel is formed. The converted fuel is mixed with air in a novel mixing chamber which causes evaporation and expansion of additional fuel droplets. The entire system is operated by an electronic fuel management control module which receives numerous signals to provide information which is assimilated in the control module and provides an output signal to the fuel metering device to control the amount of fuel introduced into the pump.

This invention has been described in detail with reference to a particular embodiment thereof, but it will be understood that various other modifications can be effected within the spirit and scope of this invention.

I claim:

1. A device for converting a combustible liquid fuel from macroscopic droplets into converted fuel in the form of a mixture of microscopic liquid droplets and vaporized fuel and supplying the converted fuel to a combustion chamber, said device comprising:
   a vacuum chamber including a cylindrical housing, having a first longitudinal axis, with an inlet in said housing wall and an outlet in said housing wall offset from said inlet;
   an eccentrically mounted cylindrical rotor within said housing wall for rotation about a second longitudinal axis offset from said first axis;
   a plurality of radial slots in said rotor; and
   a generally rectangular vane slidably received in each of said slots, said vanes being urged outwardly against said housing wall when said rotor is rotated.

2. Apparatus, as claimed in claim 1, wherein:
   said inner surface of said housing and said vanes are made of a lubricous material.

3. Apparatus, as claimed in claim 1, wherein:
   said inner surface of said housing and said vanes are coated with a polyamide or polytetrafluoroethylene.

4. Apparatus, as claimed in claim 1, further including:
   spring means for urging said vanes outwardly against said housing wall.

5. Apparatus, as claimed in claim 4, wherein:
   said vanes are arranged in opposed relationship; and
   said spring means includes at least one spring positioned between each opposed pairs of vanes to urge said vanes against said housing wall.

6. Apparatus, as claimed in claim 5, further including:
   a central passageway extending through said rotor communicating said radial slots on opposite sides of said rotor; and
   a pin extending through said passageway having a first end bearing against one of said springs and having a second end bearing against the other of said springs.

7. A fuel dispersion device for converting a liquid fuel from macroscopic droplets into converted fuel in the form of a mixture of microscopic liquid droplets and vaporized fuel, said device comprising:
   a cylindrical chamber having a first longitudinal axis and an interior cylindrical wall;
   a cylindrical rotor within said chamber mounted for rotation on an eccentric longitudinal axis laterally spaced from said first axis, said rotor having a surface which comes into near contact with said cylindrical wall along a near contact line lying in a common plane with said eccentric longitudinal axis to form a vacuum chamber between said rotor and said cylindrical wall;
   a pair of opposed longitudinal slots in said rotor, each lying in a plane passing through said rotor axis;
   a vane mounted in each of said slots for sliding movement toward and away from said rotor axis;
   means for rotating said rotor and said vanes within said housing in a predetermined direction of rotation to form a vacuum therein for converting macroscopic liquid fuel droplets into converted fuel comprising fuel vapor and microscopic fuel particles;
   a liquid fuel inlet extending through said cylindrical chamber into communication with said vacuum chamber for injecting macroscopic liquid fuel droplets, said inlet being angularly spaced to the upstream side of said plane opposite said contact line; and
   a fuel outlet extending through said cylindrical wall into communication with said vacuum chamber, said outlet being angularly spaced to the downstream side of said plane adjacent said contact line for discharging converted fuel.

8. A fuel dispersion device for an internal combustion engine as claimed in claim 7 further including:
   fuel metering means for injecting macroscopic liquid fuel droplets through said inlet into said vacuum chamber;
   a plenum connected to the outlet port of said fuel dispersion device for receiving converted fuel;
   an air intake in said plenum at a substantially right angle to said outlet for injecting air into said plenum and mixing it with the microscopic liquid fuel particles; and
   means connecting said plenum with an air intake manifold for supplying a mixture of air and converted fuel to the engine.

9. The fuel dispersion device of claim 8, further including:
   an electronic fuel management control module for controlling the fuel injected by the fuel metering means.

10. The fuel dispersion device of claim 8, wherein said plenum includes:
    a throat forming said air intake;
    a chamber adjacent said outlet of said fuel dispersion device communicating with said throat and having a greater volume than said throat for mixing the air and fuel.

11. The fuel dispersion device of claim 10, further including:
    a dividing wall in said chamber to divide the flow of air from said throat through said plenum, said outlet port being substantially bisected by said dividing wall to create turbulence of the air passing through said chamber to enhance mixing thereof with the converted fuel.

12. A fuel dispersion device, as claimed in claim 11, wherein said mixing chamber further includes:
    a curved wall opposite said outlet port to further mix the air and converted fuel.

13. A method of supplying combustible fuel to an engine comprising the steps of:
    providing a vacuum pump having an eccentric mounted rotor within a cylindrical housing and a fuel inlet in the housing and a fuel outlet in the housing offset from the inlet;

introducing macroscopic liquid fuel droplets into the inlet;

converting the macroscopic liquid fuel droplets to fuel vapor and microscopic liquid fuel droplets within the vacuum pump;

mixing air with the fuel vapor and the microscopic liquid fuel droplets to form an air-fuel mixture after they pass through the outlet but before they enter the engine.

14. A method, as claimed in claim 13, wherein:

the air is introduced to the converted fuel substantially at right angles thereto to assure substantially complete mixing of the converted fuel and air before entering the engine.

15. A method of providing a converted fuel in the form of microscopic liquid fuel droplets and vaporized fuel into the intake manifold of an engine, said method comprising the steps of:

introducing macroscopic liquid fuel droplets into a closed vacuum chamber at ambient temperature;

converting the macroscopic liquid fuel droplets to gaseous fuel and microscopic liquid fuel droplets within the chamber to form converted fuel;

discharging the converted fuel from the chamber;

mixing the converted fuel with air to form an air-fuel mixture; and introducing the air-fuel mixture into the combustion chamber of an engine.

16. A method, as claimed in claim 15, including the further step of:

using air flow during the mixing step to create a positive flow of the mixture into the combustion chamber.

17. A method, as claimed in claim 15, including the further step of:

heating the chamber.

18. A method, as claimed in claim 17, wherein:

said heating step is accomplished by the frictional resistance of the moving parts within the chamber.

19. A method of cold starting an engine which is fueled by alcohol or other hard starting fuel comprising the steps of:

injecting macroscopic liquid fuel droplets into a completely closed vacuum creating device at ambient temperature;

converting the macroscopic liquid fuel droplets to gaseous fuel and microscopic liquid fuel droplets within the vacuum creating device to form converted fuel;

discharging the converted fuel from the vacuum creating device;

mixing the converted fuel with air to form a fuel/air mixture in the proper ratio for combustion; and introducing the fuel/air mixture into the combustion chamber of an engine.

20. A method, as claimed in claim 19, wherein said converting step includes:

using vacuum to increase the evaporation rate of liquid fuel droplets to vaporize some of the fuel;

expanding and releasing absorbed gases from the macroscopic liquid fuel droplets to blow them apart and breakup into microscopic liquid fuel droplets;

using mechanical energy to agitate the macroscopic liquid fuel droplets to break surface tension within the droplets to release additional absorbed gases; and using heat energy to raise the temperature of liquid fuel droplets to enhance vaporization and expansion and release of absorbed gases.

* * * * *